(12) United States Patent
Steele, Jr.

(10) Patent No.: US 8,799,344 B2
(45) Date of Patent: Aug. 5, 2014

(54) COMPARATOR UNIT FOR COMPARING VALUES OF FLOATING POINT OPERANDS

(75) Inventor: Guy L. Steele, Jr., Lexington, MA (US)

(73) Assignee: Oracle America, Inc., Redwood City, CA (US)

(*) Notice: Subject to any disclaimer, the term of this patent is extended or adjusted under 35 U.S.C. 154(b) by 2996 days.

(21) Appl. No.: 11/394,081

(22) Filed: Mar. 31, 2006

(65) Prior Publication Data

US 2006/0206548 A1    Sep. 14, 2006

Related U.S. Application Data

(63) Continuation of application No. 10/035,586, filed on Dec. 28, 2001, now Pat. No. 7,191,202.

(60) Provisional application No. 60/293,173, filed on May 25, 2001.

(51) Int. Cl.
| | | |
|---|---|---|
| G06F 7/38 | (2006.01) | |
| G06F 9/38 | (2006.01) | |
| G06F 7/487 | (2006.01) | |
| G06F 9/30 | (2006.01) | |
| G06F 7/483 | (2006.01) | |
| G06F 7/02 | (2006.01) | |
| G06F 7/499 | (2006.01) | |
| G06F 5/01 | (2006.01) | |

(52) U.S. Cl.
CPC .............. *G06F 5/012* (2013.01); *G06F 9/3861* (2013.01); *G06F 7/4876* (2013.01); *G06F 9/30094* (2013.01); *G06F 9/30021* (2013.01); *G06F 7/49905* (2013.01); *G06F 9/3885* (2013.01); *G06F 5/015* (2013.01); *G06F 7/4873* (2013.01); *G06F 7/483* (2013.01); *G06F 9/30014* (2013.01); *G06F 7/026* (2013.01)

USPC .......................................................... 708/495

(58) Field of Classification Search
CPC ...... G06F 7/572; G06F 7/49905; G06F 7/483; G06F 9/3001; G06F 7/4876
USPC .......................................... 708/495; 340/146.2
See application file for complete search history.

(56) References Cited

U.S. PATENT DOCUMENTS

| | | | |
|---|---|---|---|
| 3,725,649 | A | 4/1973 | Deerfield |
| 4,777,613 | A | 10/1988 | Shahan et al. |

(Continued)

OTHER PUBLICATIONS

U.S. Appl. No. 10/028,375, Steele, Jr.

(Continued)

*Primary Examiner* — Tan V. Mai
(74) *Attorney, Agent, or Firm* — Marsh Fischmann & Breyfogle LLP; Kent A. Lembke (57) ABSTRACT

A floating point comparator circuit for comparing a plurality of floating point operands includes a plurality of analysis circuits, one for each of the floating point operands, configured to determine a format of each of the floating point operands based upon floating point status information encoded within each of the floating point operands, and a result generator circuit coupled to the analysis circuits, the result generator circuit configured to generate a result signal based on the format determined by each analysis circuit and based on a comparative relationship among the floating point operands. The format of each of the floating point operands may be from a group comprising: not-a-number (NaN), infinity, normalized, denormalized, zero, invalid operation, overflow, underflow, division by zero, exact, and inexact. The result generator circuit may ignore the encoded floating point statuses of the plurality of floating point operands when comparing just the magnitudes of the plurality of floating point operands.

22 Claims, 3 Drawing Sheets

(56) References Cited

U.S. PATENT DOCUMENTS

| | | | |
|---|---|---|---|
| 4,788,655 A | 11/1988 | Nakayama et al. |
| 4,991,131 A | 2/1991 | Yeh et al. |
| 5,065,352 A | 11/1991 | Nakano |
| 5,126,963 A | 6/1992 | Fukasawa |
| 5,161,117 A | 11/1992 | Waggener, Jr. |
| 5,249,149 A | 9/1993 | Cocanougher et al. |
| 5,307,303 A | 4/1994 | Briggs et al. |
| 5,347,481 A | 9/1994 | Williams |
| 5,347,482 A | 9/1994 | Williams |
| 5,357,237 A | 10/1994 | Bearden et al. |
| 5,363,321 A | 11/1994 | Dao Trong et al. |
| 5,365,465 A | 11/1994 | Larson |
| 5,481,489 A | 1/1996 | Yanagida et al. |
| 5,570,310 A | 10/1996 | Smith |
| 5,666,301 A | 9/1997 | Makino |
| 5,748,516 A | 5/1998 | Goddard et al. |
| 5,812,439 A | 9/1998 | Hansen |
| 5,862,066 A | 1/1999 | Rossin et al. |
| 5,892,697 A | 4/1999 | Brakefield |
| 5,931,943 A | 8/1999 | Orup |
| 5,953,241 A | 9/1999 | Hansen et al. |
| 5,963,461 A | 10/1999 | Gorshtein et al. |
| 5,978,901 A | 11/1999 | Luedtke et al. |
| 5,995,991 A | 11/1999 | Huang et al. |
| 6,009,511 A | 12/1999 | Lynch et al. |
| 6,049,865 A | 4/2000 | Smith |
| 6,081,823 A | 6/2000 | Purcell et al. |
| 6,105,047 A | 8/2000 | Sharangpani et al. |
| 6,108,772 A | 8/2000 | Sharangpani |
| 6,131,106 A | 10/2000 | Steele, Jr. |
| 6,138,135 A | 10/2000 | Karp |
| 6,151,669 A | 11/2000 | Huck et al. |
| 6,189,094 B1 | 2/2001 | Hinds et al. |
| 6,205,460 B1 | 3/2001 | Steele, Jr. |
| 6,219,685 B1 | 4/2001 | Story |
| 6,256,655 B1 | 7/2001 | Ezer et al. |
| 6,286,023 B1 | 9/2001 | Purcell et al. |
| 6,286,024 B1 | 9/2001 | Yano et al. |
| 6,360,189 B1 | 3/2002 | Hinds et al. |
| 6,393,555 B1 | 5/2002 | Meier et al. |
| 6,490,607 B1 | 12/2002 | Oberman |
| 6,571,265 B1 | 5/2003 | Story |
| 6,594,681 B1 | 7/2003 | Prabhu |
| 6,629,120 B1 | 9/2003 | Walster et al. |
| 6,658,443 B1 | 12/2003 | Walster |
| 6,658,444 B1 | 12/2003 | Walster et al. |
| 6,697,832 B1 | 2/2004 | Kelley et al. |
| 6,732,134 B1 | 5/2004 | Rosenberg et al. |
| 6,789,098 B1 | 9/2004 | Dijkstra |
| 2002/0194232 A1 | 12/2002 | Walster |
| 2003/0033335 A1 | 2/2003 | Walster |

OTHER PUBLICATIONS

U.S. Appl. No. 10/035,579, Steele, Jr.
U.S. Appl. No. 10/035,580, Steele, Jr.
U.S. Appl. No. 10/035,581, Steele, Jr.
U.S. Appl. No. 10/035,582, Steele, Jr.
U.S. Appl. No. 10/035,583, Steele, Jr.
U.S. Appl. No. 10/035,584, Steele, Jr.
U.S. Appl. No. 10/035,585, Steele, Jr.
U.S. Appl. No. 10/035,586, Steele, Jr.
U.S. Appl. No. 10/035,587, Steele, Jr.
U.S. Appl. No. 10/035,589, Steele, Jr.
U.S. Appl. No. 10/035,595, Steele, Jr.
U.S. Appl. No. 10/035,647, Steele, Jr.
U.S. Appl. No. 10/035,674, Steele, Jr.
U.S. Appl. No. 10/035,741, Steele, Jr.
U.S. Appl. No. 10/035,746, Steele, Jr.
U.S. Appl. No. 10/035,747, Steele, Jr.
U.S. Appl. No. 10/036,133, Steele, Jr.
U.S. Appl. No. 10/320,547, Steele, Jr.
U.S. Appl. No. 10/320,450, Steele, Jr.
Robert A. Fraley & J. Stephen Walther, "Safe Treatment of Overflow and Underflow Conditions," Hewlett-Packard Co., pp. 1-5.
Mary Payne & Dileep Bhandarkar, "Vax Floating Point: A Solid Foundation for Numerical Computation," Digital Equipment Corp., pp. 1-12.
Prof. W. Kahan, "IEEE Standard 754 for Binary Floating-Point Arithmetic," Lecture Notes, May 31, 1996, pp. 1-30.
Dmitri Chiriaev & G. William Walster, "Interval Arithmetic Specification," Draft revised May 4, 1998, pp. 1-78.
"IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

| Value "v" | s | e... | f... |
|---|---|---|---|
| +∞ | 0 | 1 1 1... | 0 0 0... |
| −∞ | 1 | 1 1 1... | 0 0 0... |
| NaN | X | 1 1 1... | Not (0 0 0...) |
| +0 | 0 | 0 0 0... | 0 0 0... |
| −0 | 1 | 0 0 0... | 0 0 0... |
| $(-1)^s 2^{e-bias}(1.|f...)$ | X | Not (0 0 0...) and Not (1 1 1...) | X |
| $(-1)^s 2^{e-bias+1}(0.|f...)$ | X | 0 0 0... | Not (0 0 0...) |

310, 320, 330, 340, 350, 360, 370

X = Don't Care

FIG. 3 (Prior Art)

COMPARATOR UNIT FOR COMPARING VALUES OF FLOATING POINT OPERANDS

INCORPORATION BY REFERENCE

This is a continuation of application Ser. No. 10/035,586, filed Dec. 28, 2001, now U.S. Pat. No. 7,191,202 and claims the benefit of U.S. Provisional Application No. 60/293,173, filed May 25, 2001, the contents of both of which are incorporated herein by reference.

Related U.S. patent application Ser. No. 10/035,747, filed in the name of Guy L. Steele Jr. and entitled "Floating Point System That Represents Status Flag Information Within A Floating Point Operand," assigned to the assignee of the present application, is hereby incorporated by reference.

FIELD OF THE INVENTION

The invention relates generally to systems and methods for performing floating point operations, and more particularly to systems and methods for comparing a pair of floating point operands each of which contains encoded floating point status information.

BACKGROUND OF THE INVENTION

Digital electronic devices, such as digital computers, calculators, and other devices, perform arithmetic calculations on values in integer, or "fixed point," format, in fractional, or "floating point" format, or both. IEEE Standard 754, (hereinafter "IEEE Std. 754" or "the Standard") published in 1985 by the Institute of Electrical and Electronic Engineers, and adopted by the American National Standards Institute (ANSI), defines several standard formats for expressing values in floating point format, and a number of aspects regarding behavior of computation in connection therewith. In accordance with IEEE Std. 754, a representation in floating point format comprises a plurality of binary digits, or "bits," having the structure:

$$se_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field represent the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field, and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats, which are generally based on the bit patterns of the bits "$e_{msb} \ldots e_{lsb}$" comprising the exponent field and the bits $f_{msb} \ldots f_{lsb}$ comprising the fraction field. For example, as shown in prior art FIG. 3, if a number is represented such that all of the bits "$e_{msb} \ldots e_{lsb}$" of the exponent field are binary ones (that is, if the bits represent a binary-encoded value of "255" in the single format or "2047" in the double format) and all of the bits $f_{msb} \ldots f_{lsb}$ of the fraction field are binary zeros, then the value of the number is positive infinity 310 or negative infinity 320, depending on the value of the sign bit "s"; in particular, the value "v" is $v=(-1)^s\infty$, where "∞" represents the value "infinity." On the other hand, if all of the bits "$e_{msb} \ldots e_{lsb}$" of the exponent field are binary ones and if the bits $f_{msb} \ldots f_{lsb}$ of the fraction field are not all zeros, then the value that is represented is deemed "not a number," 330, abbreviated in the Standard by "NaN."

Figure 3:
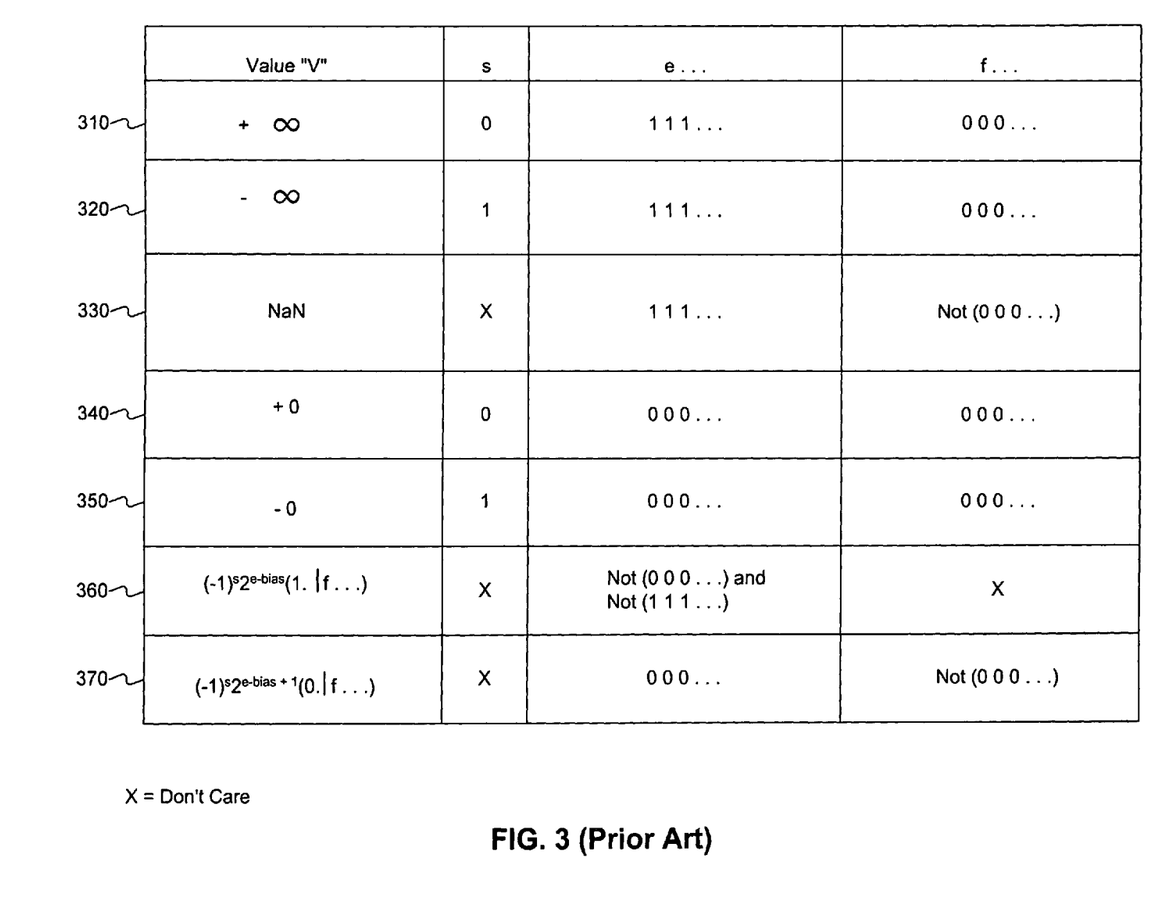
FIG. 3 depicts prior art formats for representation of floating point values.

If a number has an exponent field in which the bits "$e_{msb} \ldots e_{lsb}$" are neither all binary ones nor all binary zeros (that is, if the bits represent a binary-encoded value between 1 and 254 in the single format or between 1 and 2046 in the double format), the number is said to be in a "normalized" format 360. For a number in the normalized format, the value represented by the number is $v=(-1)^s 2^{e-bias}(1.|f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are not all zero, the number is said to be in a "de-normalized" format 370. For a number in the de-normalized format, the value represented by the number is $v=(-1)^s 2^{e-bias+1}(0.|f_{msb} \ldots f_{lsb})$. It will be appreciated that the range of values of numbers that can be expressed in the de-normalized format is disjoint from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero." It will be appreciated that the value "zero" may be positive zero 340 or negative zero 350, depending on the value of the sign bit.

Generally, floating point units to perform computations whose results conform to IEEE Std. 754 are designed to generate a result in response to a floating point instruction in three steps:

(a) First, an approximation calculation step in which an approximation to the absolutely accurate mathematical result (assuming that the input operands represent the specific mathematical values as described by IEEE Std. 754) is calculated. This calculation is sufficiently precise as to allow this accurate mathematical result to be summarized by a sign bit, an exponent (typically represented using more bits than are used for an exponent in the standard floating-point format), and some number "N" of bits of the presumed result fraction, plus a guard bit and a sticky bit. The value of the exponent will be such that the value of the fraction generated in step (a) consists of a 1 before the binary point and a fraction after the binary point. The bits are calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); then let the N most significant bits of the infinite significand be used as, the intermediate result significand, let the next bit of the infinite significand be the guard bit, and let the sticky bit be 0 if and only if ALL remaining bits of the infinite significant are 0-bits (in other words, the sticky bit is the logical OR of all remaining bits of the infinite fraction after the guard bit).

(b) Second, a rounding step, in which the guard bit, the sticky bit, perhaps the sign bit, and perhaps some of the bits of the presumed significand generated in step (a) are used to decide whether to alter the result of step (a). For the rounding modes defined by IEEE Std. 754, this is a decision as to whether to increase the magnitude of the number represented by the presumed exponent and fraction generated in step (a). Increasing the magnitude of the number is done by adding 1 to the significand in its least significant bit position, as if the significand were a binary integer. It will be appreciated that, if the significand is all 1-bits, then magnitude of the number is "increased" by changing it to a high-order 1-bit followed by all 0-bits and adding 1 to the exponent. It will be further appreciated that, (i) if the result is a positive number, and
  (a) if the decision is made to increase, effectively the decision has been made to increase the value of the result, thereby rounding the result up (that is, towards positive infinity), but
  (b) if the decision is made not to increase, effectively the decision has been made to decrease the value of the result, thereby rounding the result down (that is, towards negative infinity); and
(ii) if the result is a negative number, and
  (a) if the decision is made to increase, effectively the decision has been made to decrease the value of the result, thereby rounding the result down, but
  (b) if the decision is made not to increase, effectively the decision has been made to increase the value of the result, thereby rounding the result up.

(c) Finally, a packaging step, in which the result is packaged into a standard floating-point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, we assume that this is the step that forces the result to be a NaN if any input operand is a NaN. In this step, the decision is also made as to whether the result should be an infinity. It will be appreciated that, if the result is to be a NaN or infinity, any result from step (b) will be discarded and instead the appropriate representation will be provided as the result.

In addition in the packaging step, floating-point status information is generated, which is conventionally stored in a floating point status register. The floating point status information generated for a particular floating point operation includes indications, for example, as to whether:

(i) a particular operand is invalid for the operation to be performed ("invalid operation");

(ii) if the operation to be performed is division, the divisor is zero ("division-by-zero");

(iii) an overflow occurred during the operation ("overflow");

(iv) an underflow occurred during the operation ("underflow"); and (v) the rounded result of the operation is not exact ("inexact").

These conditions are typically represented by flags that are stored in the floating point status register, separate from the floating point operand. The floating point status information can be used to dynamically control the operations in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating point status information from, for example, results generated for a series or plurality of floating point operations.

IEEE Std. 754 has brought relative harmony and stability to floating-point computation and architectural design of floating-point units. Moreover, its design was based on some important principles and rests on sensible mathematical semantics that ease the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes, which include the rounding mode and may also include a traps enabled/disabled mode, flags representing the floating point status information that is stored in the floating point status register, and traps that are required to implement IEEE Std. 754 all introduce implicit serialization between floating-point instructions, and between floating point instructions and the instructions that read and write the flags and modes. Rounding modes can introduce implicit serialization because they are typically indicated as a global state, although in some microprocessor architectures, the rounding mode is encoded as part of the instruction operation code, which will alleviate this problem to some extent. This implicit serialization makes the Standard difficult to implement coherently in today's superscalar and parallel microprocessor architectures without loss of performance.

1. Implicit serialization occurs when programmers and designers try to avoid the problems caused if every floating point instructions uses, and can change, the same floating point status register. This can create problems if, for example, two instructions are executing in parallel in a microprocessor architectures featuring several CPUs running at once and both cause an update of the floating point status register. In such a case, the contents of the status register would likely be incorrect with respect to at least one of the instructions, because the other parallel instruction will have written over the original contents. Similar problems can occur in scalar processor architectures, in which several instructions are issued and processed at once. To solve this problem, programmers and designers make sure that floating point instructions that can affect the floating point status register are executed in serial fashion, one instruction completing before another begins.

(ii) The implicit side effects of a procedure that can change the flags or modes can make it very difficult for compilers to perform optimizations on floating-point code. To be safe, compilers for most languages assume that every procedure call is an optimization barrier.

(iii) Global flags, such as those that signal certain modes, make it more difficult to do instruction scheduling where the best performance is provided by interleaving instructions of unrelated computations. Instructions from regions of code governed by different flag settings or different flag detection requirements cannot easily be interleaved when they must share a single set of global flag bits.

(iv) Traps have been difficult to integrate efficiently into architectures and programming language designs for fine-grained control of algorithmic behavior.

U.S. patent application Ser. No. 10/035,747; filed in the name of Guy L. Steele, Jr. and entitled "Floating Point System That Represents Status Flag Information Within A Floating Point Operand," describes a floating point unit in which floating point status information is encoded in the representations of the results generated thereby. By encoding the floating point status information relating to a floating point operation in the result that is generated for the operation, the implicit serialization required by maintaining the floating point status information separate and apart therefrom can be obviated. In one embodiment, the floating point unit includes a plurality of functional units, including an adder unit, a multiplier unit, a divider unit, a square root unit, a maximum/minimum unit, a comparator unit and a tester unit, all of which operate under control of functional unit control signals provided by a control unit. Systems and methods consistent with the principles of the present invention may provide a comparator unit that can be used in the floating point unit described in that application.

SUMMARY OF THE INVENTION

Systems and methods consistent with the principles of the invention provides new and improved ways of performing floating point operations, and more particularly, comparing two floating point numbers by selectively providing a signal that indicates the comparative relationship among floating point operands, taking into consideration floating point status data encoded in the operands and/or the overall format of operands.

In one embodiment consistent with the principles of the present invention, a floating point comparator circuit for comparing a plurality of floating point operands includes a plurality of analysis circuits, one for each of the floating point operands, configured to determine a format of each of the floating point operands based upon floating point status information encoded within each of the floating point operands, and a result generator circuit coupled to the analysis circuits, the result generator circuit configured to generate a result signal based on the format determined by each analysis circuit and based on a comparative relationship among the floating point operands. The format of each of the floating point operands may be from a group comprising: not-a-number (NaN), infinity, normalized, denormalized, zero, invalid operation, overflow, underflow, division by zero, exact, and inexact. The result generator circuit may ignore the encoded floating point statuses of the plurality of floating point operands when comparing just the magnitudes of the plurality of floating point operands.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
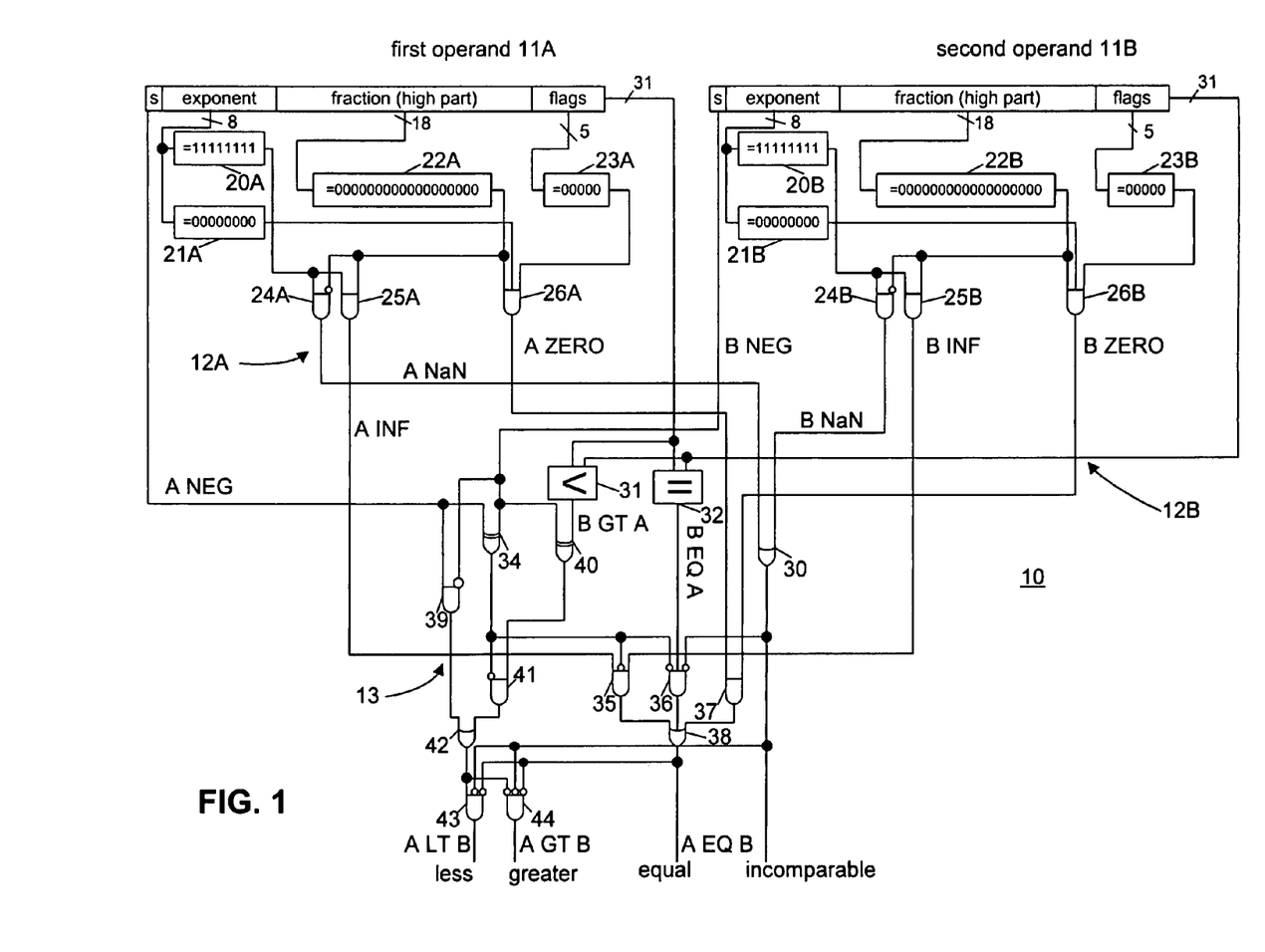
FIG. 1 is a functional block diagram of an exemplary comparator unit constructed in accordance with an embodiment of the invention.

FIG. 1 is a functional block diagram of an exemplary comparator unit 10 constructed in accordance with an embodiment of the invention. Generally, the comparator unit 10 receives two floating point operands and, in response during a comparison operation, generates signals that indicate whether the value of one operand is greater than the value of the other, the value of one operand is less than the value of the other, the values of the two operands are equal, or the values of the two operands cannot be compared. As will be described below, in some cases, operands of comparator unit 10 can include floating point status information, with the floating point status information being encoded in and comprising part of the floating point representation of the result. Since the floating point status information comprises part of the operand, instead of being separate and apart from the result as in prior art comparator units, the implicit serialization that is required by maintaining the floating point status information separate and apart from the result can be obviated. The comparator unit 10 facilitates the comparison of values of the respective operands in a manner so as to accommodate the floating point status information that may be included therein.

Figure 2:
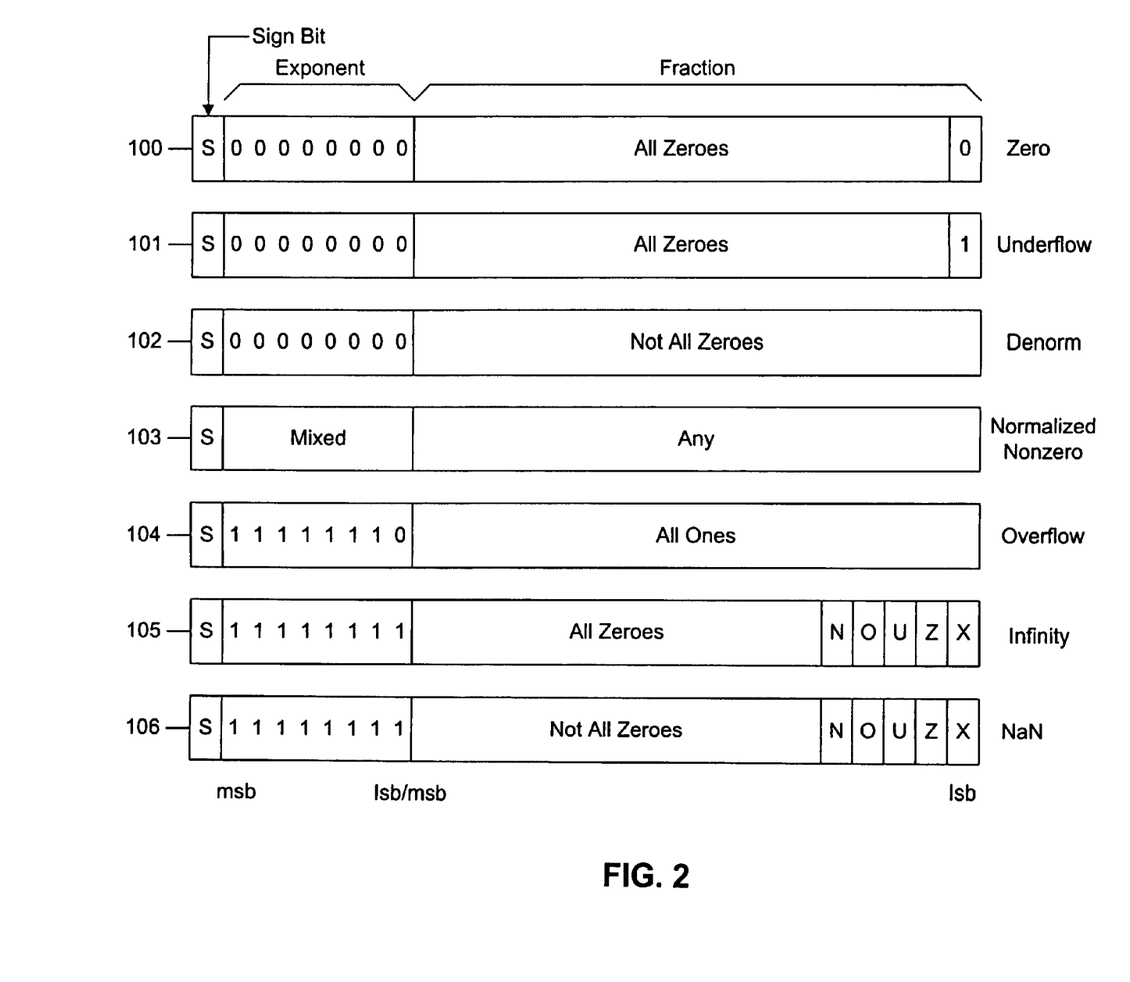
FIG. 2 depicts formats for exemplary representations of floating point values used by the comparator unit depicted in FIG. 1 and in accordance with an embodiment of the invention.

The comparator circuit 10 uses the encoded floating point status information in results that are generated in certain formats. This will be illustrated in connection with FIG. 2. FIG. 2 depicts formats of floating point operands that the comparator circuit 10 may receive. With reference to FIG. 2, seven exemplary formats are depicted, including a zero format 100, an underflow format 101, a denormalized format 102, a normalized non-zero format 103, an overflow format 104, an infinity format 105 and a not-a-number (NaN) format 106. The zero formal 100 is used to represent the values "zero," or, more specifically, positive or negative zero, depending on the value of "s," the sign bit.

The exemplary underflow format 101 provides a mechanism by which the floating point comparator circuit 10 can indicate that the result of a computation is an underflow. In the underflow format of the illustrated embodiment, the sign bit "s" indicates whether the result is positive or negative, the bits $e_{msb} \ldots e_{lsb}$ of the exponent field are all binary zeros, and the bits $f_{msb} \ldots f_{lsb+1}$ of the fraction field are all binary zeros. The least significant bit $f_{lsb}$ of the fraction field is a binary one.

The exemplary denormalized format 102 and exemplary normalized non-zero format 103 are used to represent finite non-zero floating point values substantially along the lines of that described above in connection with IEEE Std. 754. In both formats 102 and 103 of the illustrated embodiment, the sign bit "s" indicates whether the result is positive or negative. The bits $e_{msb} \ldots e_{lsb}$ of the exponent field of the denormalized formal 102 are all binary zeros, whereas the bits $e_{msb} \ldots e_{lsb}$ of the exponent field of the normalized non-zero formal 103 are mixed ones and zeros, except that the exponent field of the normalized non-zero format 103 will not have a pattern in which bits $e_{msb} \ldots e_{lsb+1}$ are all binary ones and the least significant bit $e_{lsb}$ zero and all of the bits $f_{msb} \ldots f_{lsb}$ of the fraction field are all binary ones. In format 102 the bits $f_{msb} \ldots f_{lsb}$ of the fraction field are not all binary zeros.

The exemplary overflow format 104 provides a mechanism by which the floating point comparator circuit 10 can indicate that the result of a computation is an overflow. In the overflow format 104 of the illustrated embodiment, the sign bit "s" indicates whether the result is positive or negative, the bits $e_{msb} \ldots e_{lsb+1}$ of the exponent field are all binary ones, with the least significant bit $e_{lsb}$ being zero. The bits $f_{msb} \ldots f_{lsb}$ of the fraction field are all binary ones.

The exemplary infinity format 105 provides a mechanism by which the floating point comparator circuit 10 can indicate that a result is infinite. In the infinity format 105 of the illustrated embodiment, the sign bit "s" indicates whether the result is positive or negative, the bits $e_{msb} \ldots e_{lsb}$ of the exponent field are all binary ones, and the bits $f_{msb} \ldots f_{lsb}$ of the fraction field are all binary zero's. The five least significant bits $f_{lsb+4} \ldots f_{lsb}$ of the fraction field are flags, which will be described below.

The exemplary NaN (not-a-number) format 105 provides a mechanism by which the floating point comparator circuit 10 can indicate that the result is not a number. In the NaN format of the illustrated embodiment, the sign bit "s" can be any value, the bits $e_{msb} \ldots e_{lsb}$ of the exponent field are all binary ones, and the bits $f_{msb} \ldots f_{lsb+5}$ of the fraction field are not all binary zeros. The five least significant bits $f_{lsb+4} \ldots f_{lsb}$ of the fraction field are flags, which will be described below.

As noted above, in values represented in the infinity format 105 and the NaN format 106, the five low order bits $f_{lsb+4} \ldots f_{lsb}$ of the fraction field are flags. In the formats used with the floating point comparator circuit 10, the five flags include the flags that are defined by IEEE Std. 754, including an invalid operation flag "n," an overflow flag "o," an underflow flag "u," a division-by-zero flag "z," and an inexact flag "x." For example, a value in the NaN format 106 in which both the overflow flag "o" and the division-by-zero flag "z" are set indicates that the value represents a result of a computation that involved an overflow (this from the overflow flag "o"), as well as an attempt to divide by zero (this from the division-by-zero flag "z"). It should be noted that the flags provide the same status information as provided by, for example, information stored in a floating point-status register in a prior art floating point unit. However, since the information is provided as part of the result and stored therewith in registers in which the result is ultimately stored, multiple instructions can be contemporaneously executed. This may be accomplished because the floating point status information generated during execution of one instruction, when stored, will not overwrite previously-stored floating point status information generated during execution of another instruction. In addition, in one embodiment, values in the other formats can be indicated as being inexact based in part on the least-significant bit $f_{lsb}$ of their fraction fields, and in that embodiment that bit operates as an inexact flag. The value will be indicated as being inexact if the bit $f_{lsb}$ has the value "one," and otherwise exact.

One of ordinary skill in the art will recognize that the other formats and bit patterns could be used to represent the floating point operand formats without departing from the principles of the present invention. One of ordinary skill in the art will also recognize that the floating point status information contained in the operands could easily be represented by other bit combinations (not shown) without departing from the principles of the present invention. For example, more or fewer bits could be used, a subset or superset of the exemplary status bits could be used, or the most significant bits of an operand (or some other subset of bits) could be used to indicate the floating point status information, instead of the least significant bits illustrated.

With this background the structure and operation of the exemplary comparator unit 10 will be described in connection with FIG. 1. With reference to FIG. 1, the comparator unit 10 includes two operand buffers 11A and 11B, respective operand analysis circuits 12A and 12B, and a result generator 13. The operand buffers 11A and 11B receive and store respective operands that may be received from, for example, a set of registers (not shown) in a conventional manner. Each operand analysis circuit 12A, 12B analyzes the operand in the respective operand buffer 11A, 11B and generates signals providing information relating to the respective operands. For decision circuit 13, these signals essentially provide information as to the type of the respective operand. In particular, these signals may indicate whether the respective operand is in the zero format 100, the infinity format 105, or the NaN format 106. The result generator 13 receives the signals from the operand analysis circuits 12A, 12B and additional signals representative of the operands in the operand buffers 11A and 11B and generates four result signals. In more detail, the four result signals include an A LT B (operand A is less than operand B) signal, an A GT B (operand A is greater than operand B) signal, an A EQ B (operand A is equal to operand B) signal, and an INCOMPARABLE (operand A cannot be compared to operand B) signal. One of these four signals will be asserted to indicate the comparative relationship between the values of the operands in the operand buffers 11A and 11B. If the INCOMPARABLE signal is asserted, operand A cannot be compared to operand B. Operand A cannot be compared to operand B if, for example, one or both of the operands is in the NaN format 106. In one embodiment, if the operands in both operand buffers 11A and 11B are in the zero format 100, they will be equal even if their signs differ. The comparator unit 10 can provide the result signals to a control unit (not shown) for controlling a floating point unit that includes the comparator unit 10, as described in the aforementioned related patent application.

One of ordinary skill in the art will recognize that the comparative relationship between two operands can be easily redefined to differ from those of the exemplary embodiments, without departing from the scope of the present invention. For example, the aforementioned "equal" comparative relationship between positive zero and negative zero may be redefined such that positive zero is "greater than" negative zero. Or, for example, the comparative relationship between a finite value operand and a NaN format operand may be defined such that a finite value is greater than NaN (instead of incomparable), without departing from the scope of the present invention.

As noted above, each operand analysis circuit 12A, 12B analyzes the operand in the respective buffer 11A, 11B and generates signals providing information relating thereto, which signals are provided to the decision circuit 13. In the embodiment illustrated in FIG. 1, each exemplary operand analysis circuit 12A, 12B, generally comprises a number of comparators, including:

(i) a comparator 20A, 20B that generates an asserted signal if the bits $e_{msb} \ldots e_{lsb}$ of the exponent field of the operand in respective buffer 11A, 11B are all binary ones, which will be the case if the operand is in the infinity format 105 or the NaN format 106;

(ii) a comparator 21A, 21B that generates an asserted signal if the bits $e_{msb} \ldots e_{lsb}$ of the exponent field of the operand in respective buffer 11A, 11B are all binary zeros, which will be the case if the operand is in the zero format 100, underflow format 101, or denormalized format 102;

(iii) a comparator 22A, 22B that generates an asserted signal if the bits $f_{msb} \ldots f_{lsb+5}$ of the fraction field of the operand in the respective buffer 11A, 11B are all binary zeros, which may be the case if the operand is in the zero format 100, underflow format 101, denormalized format 102, normalized non-zero format 103 or infinity format 105;

(iv) a comparator 23A, 23B that generates an asserted signal if all of the bits $f_{lsb+4} \ldots f_{lsb}$ of the fraction field of the operand in the respective buffer 11A, 11B are binary zero's, which will be the case if the operand is in the zero format 100, and which may be the case if the operand is in the denormalized formal 102, normalized non-zero format 103, or if the flags "n," "o", "u," "z" and "x" are clear in the infinity format 105 or NaN format 106;

(v) a NAND gate 24A, 24B that generates an asserted A NaN, B NaN signal if the comparator 20A, 20B is generating an asserted signal and the comparator 22A, 22B is generating a negated signal; it will be appreciated that the NAND gate 24A, 24B will be generating an asserted signal if the operand in the respective operand buffer 11A, 11B is in the NaN format 106;

(vi) an AND gate 25A, 25B that generates an asserted A INF, B INF signal if the comparator 22A, 22B is generating an asserted signal and the comparator 20A, 20B is also generating an asserted signal; it will be appreciated that the AND gate 25A, 25B will be generating an asserted signal if the operand in the respective operand buffer 11A, 11B is in the infinity format 105; and (vii) an AND gate 26A, 26B that generates an asserted A ZERO, B ZERO signal if the comparator 21A, 21B is generating an asserted signal, the comparator 22A, 22B is generating an asserted signal, and the comparator 23A, 23B is generating an asserted signal; it will be appreciated that this will be the case if both of the operands in the operand buffers 11A, 11B are in the zero format 100.

As noted above, the result generator 13 receives the signals from the operand analysis circuits 12A, 12B and signals representative of the operands in the operand buffers 11A and 11B and generates four result signals. In one embodiment, these result signals may include an A LT B (operand A is less than operand B) signal, an A GT B (operand A is greater than operand B) signal, an A EQ B (operand A is equal to operand B) signal, and an INCOMPARABLE signal, one of which will be asserted to indicate the comparative relationship between the values of the operands in the operand buffers 11A and 11B.

In the illustrated embodiment of the invention in FIG. 1, the exemplary result generator 13 includes:

(viii) an OR gate 30 that generates an asserted INCOMPARABLE signal if either the A NaN signal from NAND gate 24A or the B NaN signal from NAND gate 24B is asserted; it will be appreciated that the OR gate 30 will be generating an asserted signal if the operand in either operand buffer 11A, 11B is in the NaN format 106;

(ix) a comparator 31 that generates an asserted B GT A (operand B is greater than operand A) signal if the magnitude, or absolute value, of the operand in operand buffer 11B is greater than the magnitude of the operand in operand buffer 11A;

(x) a comparator 32 that generates an asserted B EQ A (operand B is equal to operand A) signal if the magnitude of the operand in the operand buffer 11B is equal to the magnitude of the operand in operand buffer 11A;

(xi) an XOR gate 34 that generates an asserted S A NEQ S B (sign A not equal to sign B) signal if an A NEG signal, representative of the sign bit of the operand in operand buffer 11A, is asserted and a B NEG signal, representative of the sign bit of the operand in operand buffer 11B, is negated, or vice versa; otherwise XOR gate 34 generates a negated signal; it will be appreciated that the XOR gate 34 will be generating an asserted signal if the operands in the operand buffers 11A and 11B are of opposite signs, and a negated signal if the operands are of the same sign;

(xii) a NAND gate 35 that generates an asserted signal if the A INF signal from AND gate 25A and the B INF signal from AND gate 25B are both asserted and the S A NEQ S B (sign A not equal to sign B) signal from XOR gate 34 is negated; it will be appreciated that the NAND gate 35 will be generating an asserted signal if the operands in both operand buffers 11A and 11B are in the infinity format 105 and are of the same sign;

(xii) a NAND gate 36 that generates an asserted signal if the INCOMPARABLE signal from OR gate 30 is negated and the B EQ A signal from comparator 32 is asserted and the S A NEQ S B (sign A not equal to sign B) signal from XOR gate 34 is negated; it will be appreciated that the NAND gate 36 will be generating an asserted signal if the magnitude and sign of the operand in operand buffer 11A equals the magnitude and sign of the operand in operand buffer 11B and neither operand is in the NaN format 106;

(xiv) an AND gate 37 that generates an asserted signal if the A ZERO and B ZERO signals from AND gates 26A and 26B are both asserted; it will be appreciated that the AND gate 37 will be generating an asserted signal if the operands in both operand buffers 11A and 11B are in the zero format 100, regardless of the signs of the respective operands;

(xv) an OR gate 38 that generates an asserted A EQ B (operand A equals operand B) signal if any of NAND gates 35 or 36 or AND gate 37 is generating an asserted signal; it will be appreciated that OR gate 38 will be generating an asserted signal if:
  (a) the operands in both operand buffers 11A and 11B are in the infinity format 105 and are of the same sign (reference NAND gate 35); or
  (b) the magnitudes and signs of the operands in the operand buffers 11A and 11B are the same and neither operand is in the NaN format 106 (reference NAND gate 36); or
  (c) the operands in both operand buffers 11A and 11B are in the zero format 100, regardless of their signs (reference AND gate 37);

(xvi) a NAND gate 39 that generates an asserted signal if the A NEG signal representative of the sign of the operand in operand buffer 11A is asserted and the B NEG signal representative of the sign of the operand in operand buffer 11B is not asserted; it will be appreciated that the NAND gate 39 will be generating an asserted signal if the sign of the operand in operand buffer 11A is negative and the sign of the operand in operand buffer 11B is positive;

(xvii) an XOR gate 40 that generates an asserted signal if the B GT A signal from the comparator 31 is asserted and the B NEG signal is negated, or if the B GT A signal is negated and the B NEG signal is asserted, it will be appreciated that the XOR gate 40 will be generating:
  (a) an asserted signal if
    (I) the magnitude of the operand in operand buffer 11B is greater than the magnitude of the operand in operand buffer 11A and the operand in operand buffer 11B is positive, or (II) the magnitude of the operand in operand buffer 11B is not greater than the magnitude of the operand in operand buffer 11A and the operand in operand buffer 11B is negative, and (b) a negated signal if (1) the magnitude of the operand in operand buffer 11B is greater than the magnitude of the operand in operand buffer 11A and the operand in operand buffer 11B is negative, or (II) the magnitude of the operand in operand buffer 11B is not greater than the magnitude of the operand in operand buffer 11A and the operand in operand buffer 11B is positive;

(xviii) a NAND gate 41 that generates an asserted signal if the signal generated by the XOR gate 34 is negated and the signal generated by XOR gate 40 is asserted; it will be appreciated that NAND gate 41 will be generating an asserted signal if:

(a) the A NEG and B NEG signals are both negated indicating that the operands in both operand buffers are positive, and the magnitude of the operand in operand buffer 11B is greater than the magnitude of the operand in operand buffer 11A, or (b) the A NEG and B NEG signals are both asserted, indicating that the operands in both operand buffers are negative, and the magnitude of the operand in operand buffer 11B is not greater than the magnitude of the operand in operand buffer 11A;

(xix) an OR gate 42 that generates an asserted signal if either NAND gate 39 or NAND gate 41 is generating an asserted signal, it will be appreciated that OR gate 42 will be generating an asserted signal if:

(a) the A NEG and B NEG signals are both negated, indicating that the operands in both operand buffers are positive, and the magnitude of the operand in operand buffer 11B is greater than the magnitude of the operand in operand buffer 11A, or (b) the A NEG and B NEG signals are both asserted, indicating that the operands in both operand buffers are negative, and the magnitude of the operand in operand buffer 11B is not greater than the magnitude of the operand in operand buffer 11A, or (c) the operand in buffer 11A is negative and the operand in buffer 11B is positive;

(xx) a NAND gate 43 that generates an asserted A LT B operand A less than operand B signal if OR gate 42 is generating an asserted signal and OR gates 30 and 38 are generating negated signals; it will be appreciated that NAND gate 43 will be generating an asserted signal if the operands can be compared, the operands are not equal; and:

(a) the A NEG and B NEG signals are both negated, indicating that the operands in both operand buffers are positive, and the magnitude of the operand in operand buffer 11B is greater than the magnitude of the operand in operand buffer 11A, or (b) the A NEG and B NEG signals are both asserted, indicating that the operands in both operand buffers are negative, and the magnitude of the operand in operand buffer 11B is not greater than the magnitude of the operand in operand buffer 11A, or (c) the operand in buffer 11A is negative and the operand in buffer 11B is positive;

(xxi) a NAND gate 44 that generates an asserted A GT B (operand A greater than operand B) signal if OR gates 42, 30 and 38 are generating negated signals; it will be appreciated that NAND gate 44 will be generating an asserted signal if the operands can be compared and the operands are not equal, and either:

(a) the operands in both operand buffers are positive, and the magnitude of the operand in operand buffer 11B is not greater than the magnitude of the operand in operand buffer 11A, or (b) the operands in both operand buffers are negative, and the magnitude of the operand in operand buffer 11B is greater than the magnitude of the operand in operand buffer 11A, or (c) the operand in buffer 11A is positive or the operand in buffer 11B is negative.

As noted above, the exemplary comparator unit 10 can provide the A LT B, A GT B, A EQ B and INCOMPARABLE result signals to a control unit for controlling a floating point unit that includes the comparator unit 10, as described in the aforementioned related patent application. The result of a comparison operation can be used for a number of functions, which will be apparent to those skilled in the art, including controlling the behavior of conditional branch, conditional move, boolean result generation, and conditional trap instructions. The instruction that enables the comparison operation to be performed may be a separate instruction, or the comparison operation may be performed as part of the execution of a conditional branch, conditional move, boolean result generation or conditional trap instruction.

One of ordinary skill in the art will recognize that the circuits implementing the comparative relationships between the operands specified in the preceding description to produce the result can easily be altered to implement different comparative relationships and generate different results without departing from the principles of the present invention. For example, the relationships may be redesigned so that the generated result is A LT B if operand A is in the negative zero format and operand B is in the positive zero format, instead of generating an A EQ B result as is done by the exemplary circuit.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Those skilled in the art will appreciate that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

The foregoing description has been limited to specific embodiments of this invention. It will be apparent, however, that various variations and modifications may be made to the invention, with the attainment of some or all of the advantages of the invention. It is the object of the appended claims to cover these and such other variations and modifications as come within the true spirit and scope of the invention

What is claimed is:

1. A floating point comparator circuit for comparing a plurality of floating point operands, comprising:
   a plurality of analysis circuits, one for each of the floating point operands, configured to determine a format of each of the floating point operands based upon floating point status information encoded within each of the floating point operands; and
   a result generator circuit coupled to the analysis circuits, the result generator circuit configured to generate a result signal based on the format determined by each analysis circuit and based on a comparative relationship among the floating point operands.

2. The floating point comparator circuit of claim 1, further comprising:
   a plurality of operand buffers, one of the operand buffers coupled to each of the analysis circuits, for supplying each of the floating point operands to each of the analysis circuits, respectively.

3. The floating point comparator circuit of claim 1, wherein the format of each of the floating point operands is from a group comprising: not-a-number (NaN), infinity, normalized, denormalized, zero, invalid operation, overflow, underflow, division by zero, exact, and inexact.

4. The floating point comparator circuit of claim 3, wherein the format represents one of: a positive overflow (+OV) and a negative overflow (−OV).

5. The floating point comparator circuit of claim 3, wherein the format represents one of: a positive underflow (+UN) and a negative underflow (−UN).

6. The floating point comparator circuit of claim 3, wherein the format represents one of a positive infinity and a negative infinity.

7. The floating point comparator circuit of claim 3, wherein the format represents a combination of at least two of the group comprising: not-a-number (NaN), infinity, normalized, denormalized, zero, invalid operation, overflow, underflow, division by zero, exact, and inexact.

8. The floating point comparator circuit of claim 1, wherein the result generator circuit ignores the floating point status information encoded in each of floating point operands when determining the comparative relationship among the floating point operands.

9. The floating point comparator circuit of claim 1, wherein the plurality of analysis circuits are each configured to determine a format of a floating point operand based upon floating point status information encoded within at least one of:
   the exponent portion of the floating point operand;
   the fraction portion of the floating point operand; and
   a combination of the exponent portion of the floating point operand and the fraction portion of the floating point operand.

10. The floating point comparator circuit of claim 1, wherein the plurality of analysis circuits are each configured to determine a format of a floating point operand based upon floating point status information encoded within at least one of:
   the exponent portion of the floating point operand;
   the fraction portion of the floating point operand; and
   a combination of the exponent portion of the floating point operand and the fraction portion of the floating point operand.

11. A computer implemented method for comparing a first floating point operand to a second floating point operand, wherein each floating point operand includes encoded floating point status information, the method comprising:
   receiving the first floating point operand in a first operand buffer of a computer system;
   receiving the second floating point operand in a second operand buffer of the computer system;
   determining from the first floating point operand in the first operand buffer a first format of the first floating point operand based on the encoded floating point status information in the first floating point operand, wherein the determining from the first floating point operand step is performed by a first analysis circuit of the computer system;
   determining from the second floating point operand in the second operand buffer a second format of the second floating point operand based on the encoded floating point status information in the second floating point operand, wherein the determining from the second floating point operand step is performed by a second analysis circuit of the computer system;
   generating a first signal representative of the first format, wherein the first signal is generated by analyzing the first floating point operand in the first operand buffer, wherein the first signal is generated by the first analysis circuit of the computer system;
   generating a second signal representative of the second format, wherein the second signal is generated by analyzing the second floating point operand in the second operand buffer, wherein the second signal is generated by the second analysis circuit of the computer system; and
   generating, by a result generator circuit of the computer system, a result indicating a comparative relationship between the first floating point operand and the second floating point operand, based at least on the first signal and the second signal received by the result generator circuit from the first and second analysis circuits.

12. The method of claim 11, further comprising:
   controlling a floating point device based upon the result generated.

13. The method of claim 11, wherein the first signal indicates that the first format is a format selected from a group consisting of: not-a-number (NaN), infinity, normalized, denormalized, invalid operation, zero, overflow, underflow, division by zero, exact, and inexact, wherein the second signal indicates that the second format is a format selected from the group, and wherein the first format is different than the second format.

14. The method of claim 11, wherein the step of generating the result indicating the comparative relationship between the first floating point operand and the second floating point operand further comprises:
   ignoring the first encoded floating point status information and the second encoded floating point status information when comparing a magnitude of the first floating point operand with a magnitude of the second floating point operand.

15. The method of claim 11, wherein the result indicates the comparative relationship chosen from a group comprising: the first floating point operand is less than the second floating point operand, the first floating point operand is greater than the second floating point operand, the first floating point operand is equal to the second floating point operand, and the first floating point operand cannot be compared to the second floating point operand.

16. The method of claim 11, wherein the encoded floating point status information in the first floating point operand is encoded within at least one of:
the exponent portion of the first floating point operand;
the fraction portion of the first floating point operand; and
a combination of the exponent portion of the first floating point operand and the fraction portion of the first floating point operand,
wherein the encoded floating point status information in the second floating point operand is encoded within at least one of:
the exponent portion of the second floating point operand;
the fraction portion of the second floating point operand; and
a combination of the exponent portion of the second floating point operand and the fraction portion of the second floating point operand.

17. A tangible computer-readable medium on which is stored a set of instructions for a computer system for comparing a first floating point operand to a second floating point operand, each floating point operand having encoded floating point status information, which when executed cause the computer system to perform steps comprising:
receiving the first floating point operand and the second floating point operand;
determining a first format of the first floating point operand based on the encoded floating point status information in the first floating point operand;
determining a second format of the second floating point operand based on the encoded floating point status information in the second floating point operand; and
generating a result indicating a comparative relationship between the first floating point operand and the second floating point operand, based at least on the first format and the second format.

18. The computer-readable medium of claim 17, further comprising instructions for the computer system, which when executed cause the computer system to perform the step of:
comparing the first floating point operand to the second floating point operand.

19. The computer-readable medium of claim 17, further comprising instructions for the computer system, which when executed cause the computer system to perform the step of:
controlling a floating point device based upon the result generated.

20. The computer-readable medium of claim 17, wherein the format is from a group comprising not-a-number (NaN), infinity, normalized, denormalized, zero, invalid operation, overflow, underflow, division by zero, exact, and inexact.

21. The computer-readable medium of claim 17, wherein the set of instructions for the computer system, which when executed cause the computer system to perform the step of generating a result indicating the comparative relationship between the first floating point operand and the second floating point operand further comprises instructions for the computer system, which when executed cause the computer system to perform the step of:
ignoring the first encoded floating point status information and the second encoded floating point status information when comparing a magnitudes of the first floating point operand with a magnitude of the second floating point operand.

22. The computer-readable medium of claim 17, wherein the result indicates the comparative relationship chosen from a group comprising: the first floating point operand is less than the second floating point operand, the first floating point operand is greater than the second floating point operand, the first floating point operand is equal to the second floating point operand, and the first floating point operand cannot be compared to the second floating point operand.

* * * * *

UNITED STATES PATENT AND TRADEMARK OFFICE
CERTIFICATE OF CORRECTION

| | | |
|---|---|---|
| PATENT NO. | : 8,799,344 B2 | Page 1 of 1 |
| APPLICATION NO. | : 11/394081 | |
| DATED | : August 5, 2014 | |
| INVENTOR(S) | : Steele, Jr. | |

It is certified that error appears in the above-identified patent and that said Letters Patent is hereby corrected as shown below:

In the Specification

In column 3, line 9, delete "as," and insert -- as --, therefor.

In column 5, line 14, delete "10/035,747;" and insert -- 10/035,747 --, therefor.

In column 7, line 46, delete "point-status" and insert -- point status --, therefor.

In column 10, line 20, delete "(xii)" and insert -- (xiii) --, therefor.

In column 13, line 7, delete "invention" and insert -- invention. --, therefor.

Signed and Sealed this
Third Day of March, 2015

Michelle K. Lee
*Deputy Director of the United States Patent and Trademark Office*